(12) United States Patent
Gomez Gutierrez et al.

(10) Patent No.: US 9,952,620 B2
(45) Date of Patent: Apr. 24, 2018

(54) TIME-SYNCHRONIZING A GROUP OF NODES

(71) Applicant: INTEL CORPORATION, Santa Clara, CA (US)

(72) Inventors: David Gomez Gutierrez, Cd Guzmán (MX); Jose Parra Vilchis, Guadalajara (MX); Rafael De La Guardia Gonzalez, Jalisco (MX)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/249,873

(22) Filed: Apr. 10, 2014

(65) Prior Publication Data

US 2015/0295700 A1    Oct. 15, 2015

(51) Int. Cl.
| | |
|---|---|
| *G06F 11/16* | (2006.01) |
| *G06F 1/14* | (2006.01) |
| *H04J 3/06* | (2006.01) |
| *H04W 56/00* | (2009.01) |
| *H04L 7/00* | (2006.01) |

(52) U.S. Cl.
CPC .............. *G06F 1/14* (2013.01); *H04J 3/0635* (2013.01); *H04W 56/001* (2013.01); *G06F 11/1675* (2013.01); *H04L 7/0008* (2013.01)

(58) Field of Classification Search
CPC ................................................. G06F 11/1675
USPC ......................................................... 709/248
See application file for complete search history.

(56) References Cited

U.S. PATENT DOCUMENTS

| | | | | |
|---|---|---|---|---|
| 5,787,272 | A * | 7/1998 | Gupta | G06F 8/458 |
| | | | | 709/248 |
| 5,887,143 | A * | 3/1999 | Saito | G06F 8/458 |
| | | | | 709/200 |
| 6,052,712 | A * | 4/2000 | Badovinatz | G06F 8/458 |
| | | | | 709/201 |
| 6,907,472 | B2 * | 6/2005 | Mushkin | H04B 3/54 |
| | | | | 709/248 |
| 7,103,124 | B1 | 9/2006 | Lindskog et al. | |
| 7,573,303 | B1 * | 8/2009 | Chi | H03L 7/23 |
| | | | | 327/105 |
| 8,938,636 | B1 * | 1/2015 | Hochschild | H04J 3/0661 |
| | | | | 709/248 |

(Continued)

FOREIGN PATENT DOCUMENTS

TW    200401187 A    1/2004

OTHER PUBLICATIONS

Bechon, et al., "Synchronization and Quorum Sensing in a Swarm of Humanoid Robots", Adaptation and Self-Organizing Systems, May 27, 2013, pp. 1-5.

(Continued)

*Primary Examiner* — Matthew J Brophy
(74) *Attorney, Agent, or Firm* — Schwabe, Williamson & Wyatt, P.C.

(57) ABSTRACT

Systems and methods include receiving, values of one or more first external time variables from a first external node and values of one or more second external time variables from a second external node. The values of one or more local time variables of the local node are adjusted based at least upon the values of the one or more first external time variables and the values of the one or more second external time variables.

30 Claims, 12 Drawing Sheets

(56) References Cited

U.S. PATENT DOCUMENTS

| | | | | |
|---|---|---|---|---|
| 2002/0178292 | A1* | 11/2002 | Mushkin | H04B 3/54 |
| | | | | 709/248 |
| 2003/0016770 | A1* | 1/2003 | Trans | H04B 1/00 |
| | | | | 375/346 |
| 2005/0013394 | A1* | 1/2005 | Rausch | G04G 7/00 |
| | | | | 375/356 |
| 2006/0229047 | A1* | 10/2006 | Petchenev | G01M 15/12 |
| | | | | 455/255 |
| 2008/0169801 | A1* | 7/2008 | Petchenev | G01D 5/2448 |
| | | | | 324/76.12 |
| 2008/0244094 | A1 | 10/2008 | Rich et al. | |
| 2008/0256262 | A1* | 10/2008 | de Araujo | H04J 3/0658 |
| | | | | 709/248 |
| 2009/0172198 | A1* | 7/2009 | Hekstra-Nowacka | H04J 3/0635 |
| | | | | 709/248 |
| 2010/0303100 | A1 | 12/2010 | Niamut et al. | |
| 2011/0268097 | A1 | 11/2011 | Agrawala et al. | |
| 2012/0063447 | A1* | 3/2012 | Tyrrell | H04W 56/00 |
| | | | | 370/350 |
| 2012/0101326 | A1* | 4/2012 | Simon | A61N 1/36007 |
| | | | | 600/9 |
| 2012/0120082 | A1* | 5/2012 | Ku | H03K 19/00315 |
| | | | | 345/520 |
| 2012/0207183 | A1* | 8/2012 | Bobrek | H04J 3/0641 |
| | | | | 370/511 |
| 2013/0238815 | A1* | 9/2013 | Ogawa | H04L 45/14 |
| | | | | 709/244 |

OTHER PUBLICATIONS

Choi, et al. "DCS: Distributed Asynchronous Clock Synchronization in Delay Tolerant Networks", IEEE Transactions on Parallel and Distributed Systems, vol. 23, No. 3, Mar. 2012, pp. 491-504.

Khaluf, et al., "Master Election for Time Synchronization in Swarm Robotic Systems", 10th IEEE International Symposium on Parallel and Distributed Processing with Applications, 2012, pp. 285-292.

Klinglmayr, et al., "Guaranteeing Global Synchronization in Networks With Stochastic Interactions", IOP, New Journal of Physics 14, 073031, Feb. 29, 2012, 14 pages.

Levant, Arie, "Robust Exact Differentiation Via Sliding Mode Technique", Automatica, 34(3), 379-384, 1998, 15 pages.

Moreno, et al., "A Lyapunov Approach to Second-Order Sliding Mode Controllers and Observers", WeB10.6, Proceedings of the 47th IEEE Conference on decision and Control, Dec. 9-11, 2008, pp. 2856-2861.

Moreno, et al., "Strict Lyapunov Functions for the Super-Twisting Algorithm", IEEE Transactions on Automatic Control, vol. 57, No. 4, Apr. 2012, pp. 1035-1040.

Schwab, et al. "Dynamical Quorum-Sensing in Oscillators Coupled Through an External Medium", Physica D, Jan. 11, 2012, available at: www.elsevier.com/locate/physd, pp. 1-7.

Sommer, et al., "Gradient Clock Synchronization in Wireless Sensor Networks", IPSN'09, Apr. 13-16, 2009, 12 pages.

Trianni, et al., "Self-Organising Sync in a Robotic Swarm. A Dynamical System View", 2008, pp. 1-60.

Werner-Allen, et al., "Firefly-Inspired Sensor Network Synchronicity with Realistic Radio Effects", SenSys'05, Nov. 2-4, 2005, pp. 142-153.

International Search Report and Written Opinion dated Jul. 17, 2015 for International Application No. PCT/US2015/021560, 11 pages.

Taiwanese Search Report dated Feb. 17, 2016 for Taiwan Patent Application No. 104107434, 2 pages.

Notification Concerning Transmittal of International Preliminary Report on Patentability dated Oct. 20, 2016 from International Application No. PCT/US2015/021560, 8 pages.

\* cited by examiner

US 9,952,620 B2

TIME-SYNCHRONIZING A GROUP OF NODES

A. BACKGROUND

Numerous devices contain clocks that are used by these devices to track time independently. These clocks are typically based on physical oscillators whose accuracy determines, at least partially, the accuracy of the time tracking.

Over time, physical oscillators can typically suffer from offset to their original phase as well as skew from their originally set frequency. Accordingly, occasional resynchronization of these independent clocks may be required to ensure that these devices are operating under the same time reference.

B. BRIEF DESCRIPTION OF THE DRAWINGS

Other objects and advantages of the invention may become apparent upon reading the detailed description and upon reference to the accompanying drawings.

Figure 9:
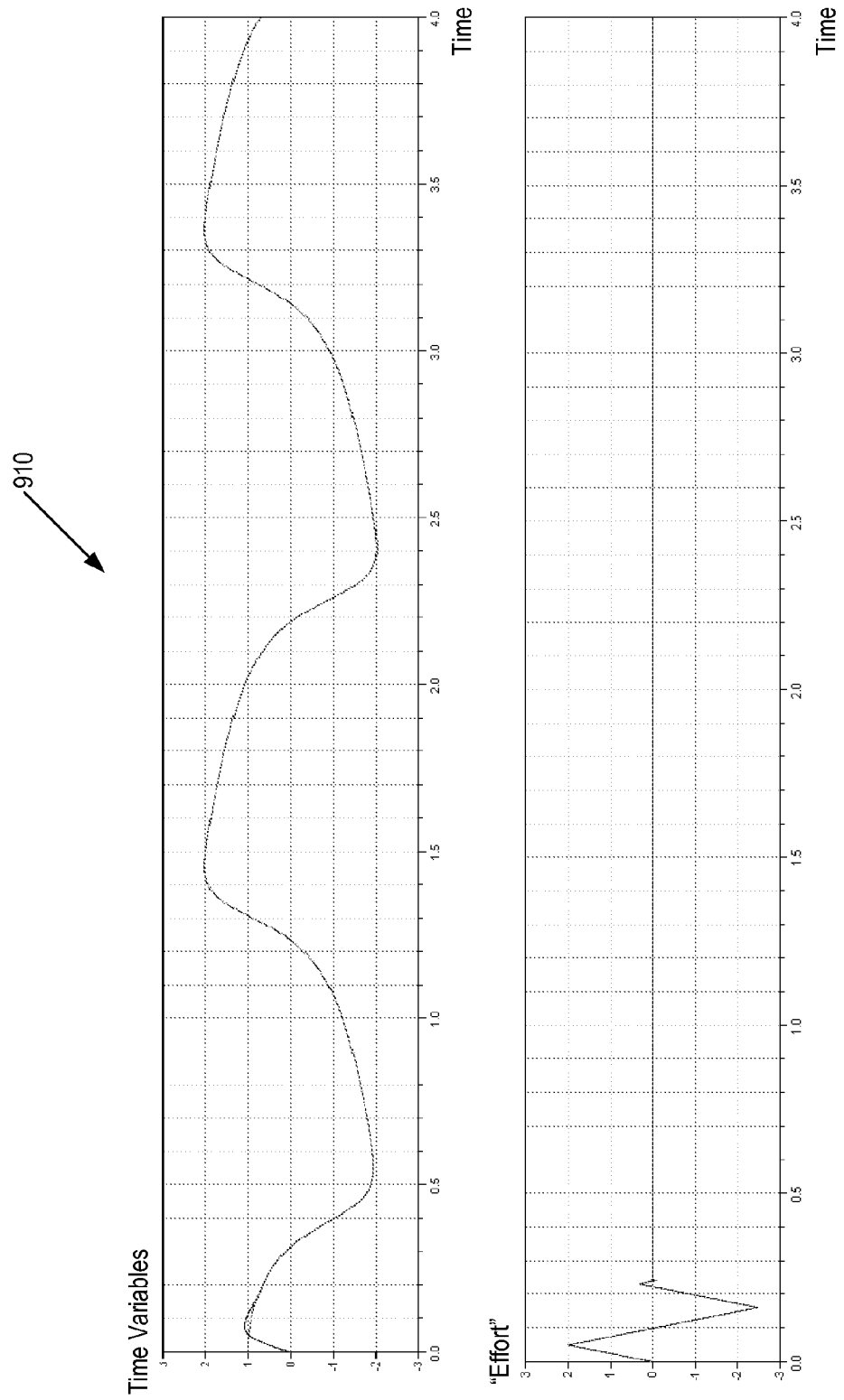

FIG. 9 includes graphs illustrating a comparison of time variables for one node observing another node and the effort required for synchronization by the observing node, in accordance with some embodiments.

Figure 10:
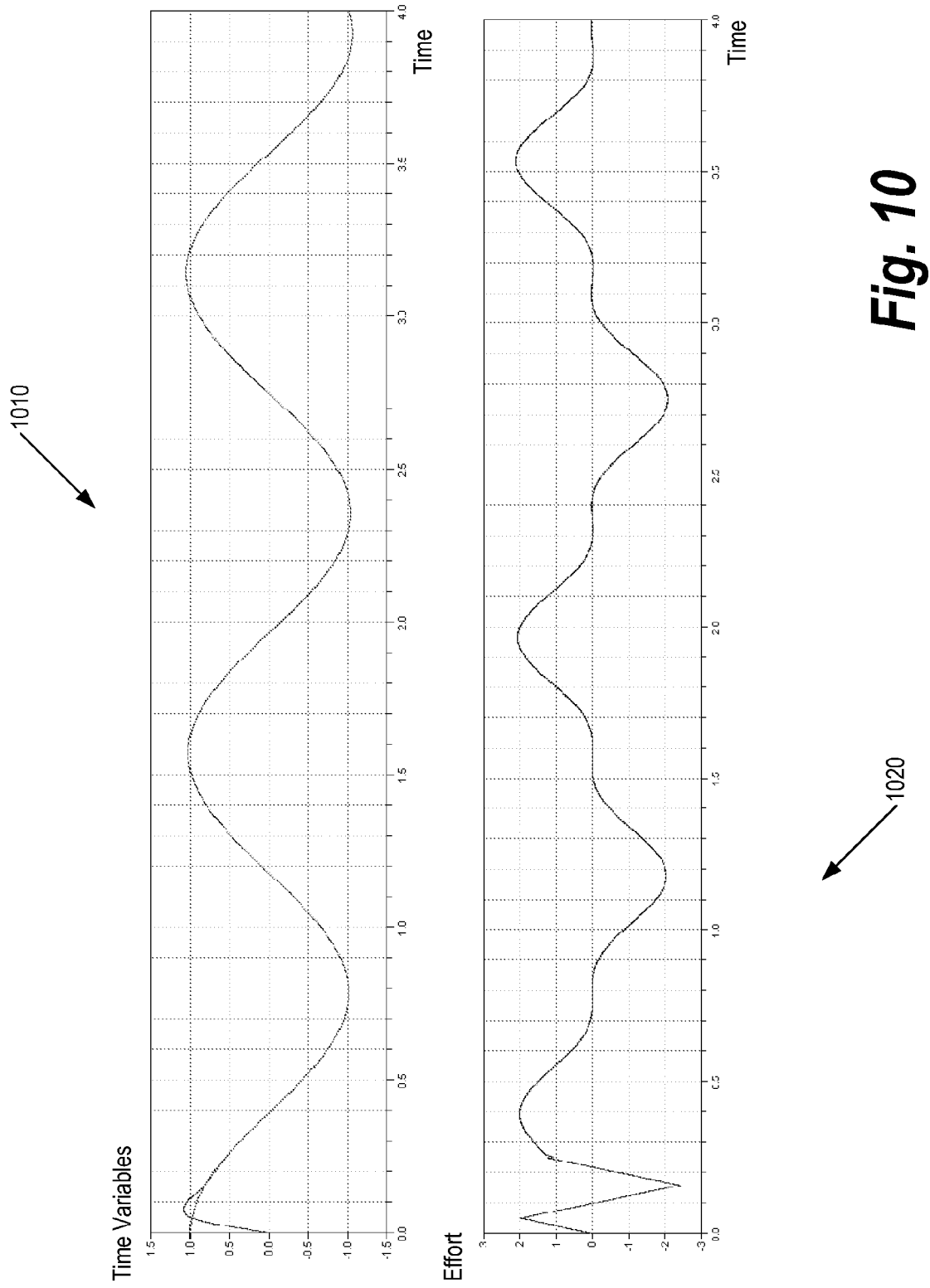

FIG. 10 includes graphs illustrating a comparison of time variables for one node observing another node and the effort required for synchronization by the observing node where the two nodes have different oscillator models, in accordance with some embodiments.

Figure 11:
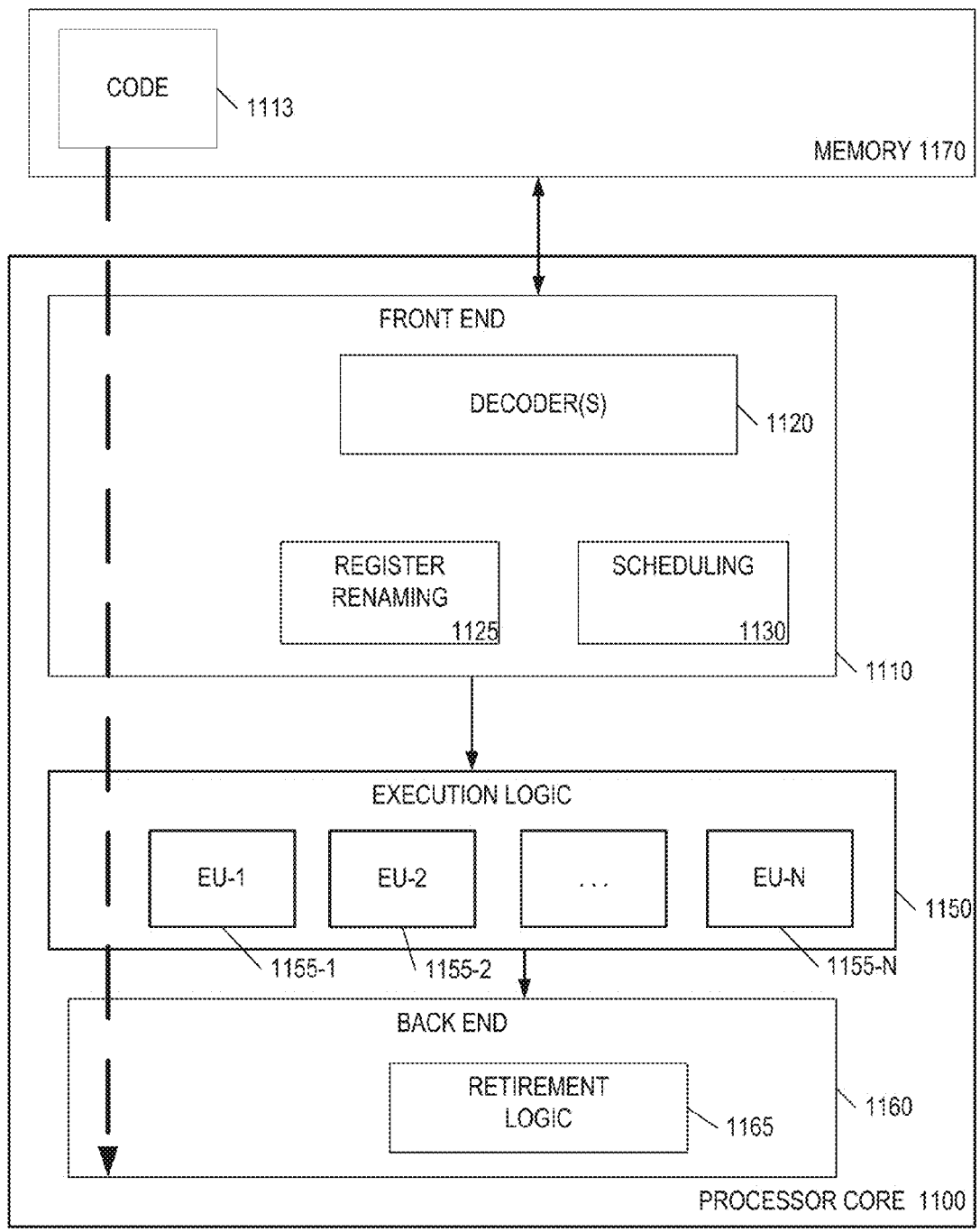

FIG. 11 is a block diagram illustrating a processor, in accordance with some embodiments.

Figure 12:
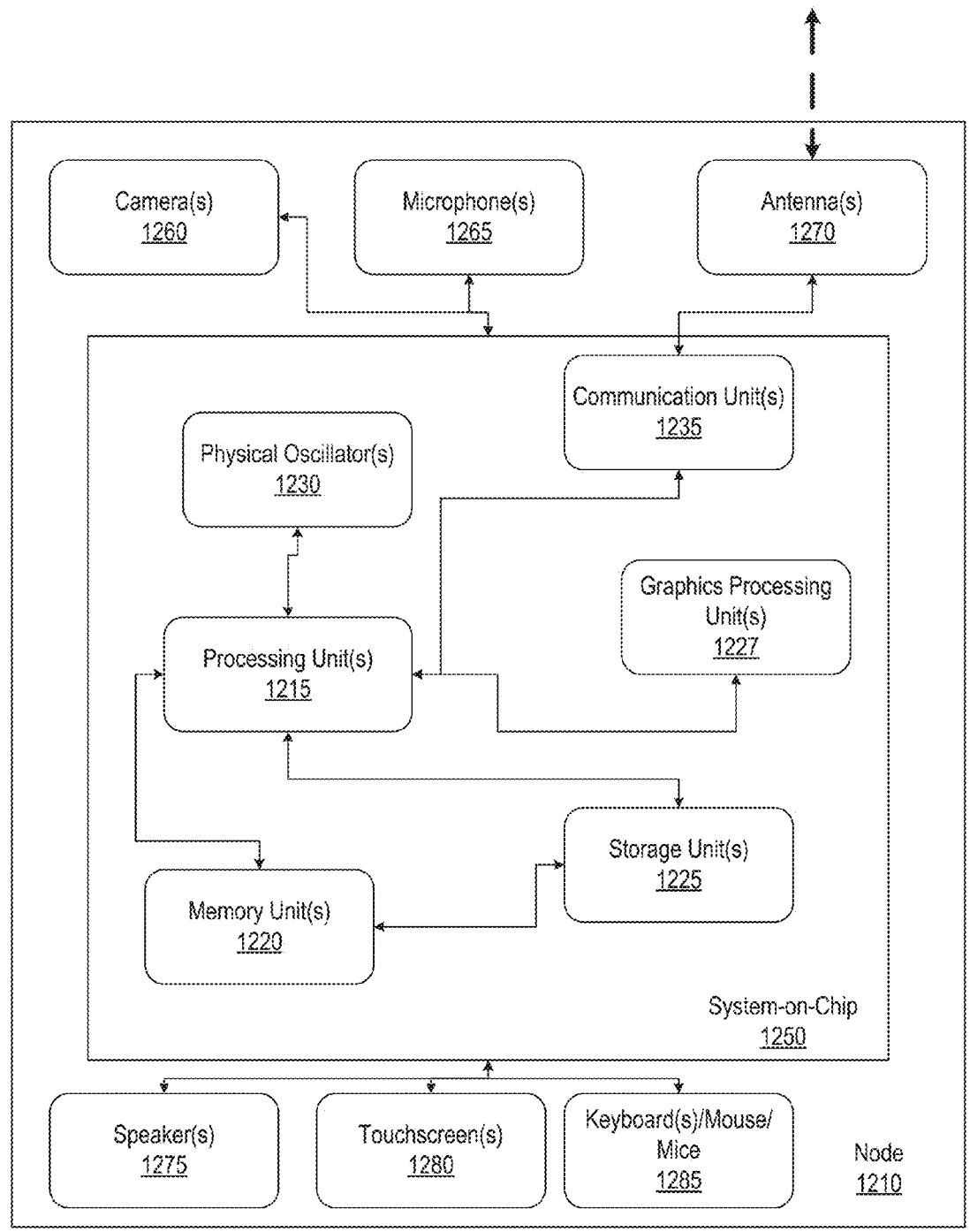

FIG. 12 is a block diagram illustrating a node including a system-on-chip, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

C. DETAILED DESCRIPTION

Figure 1:
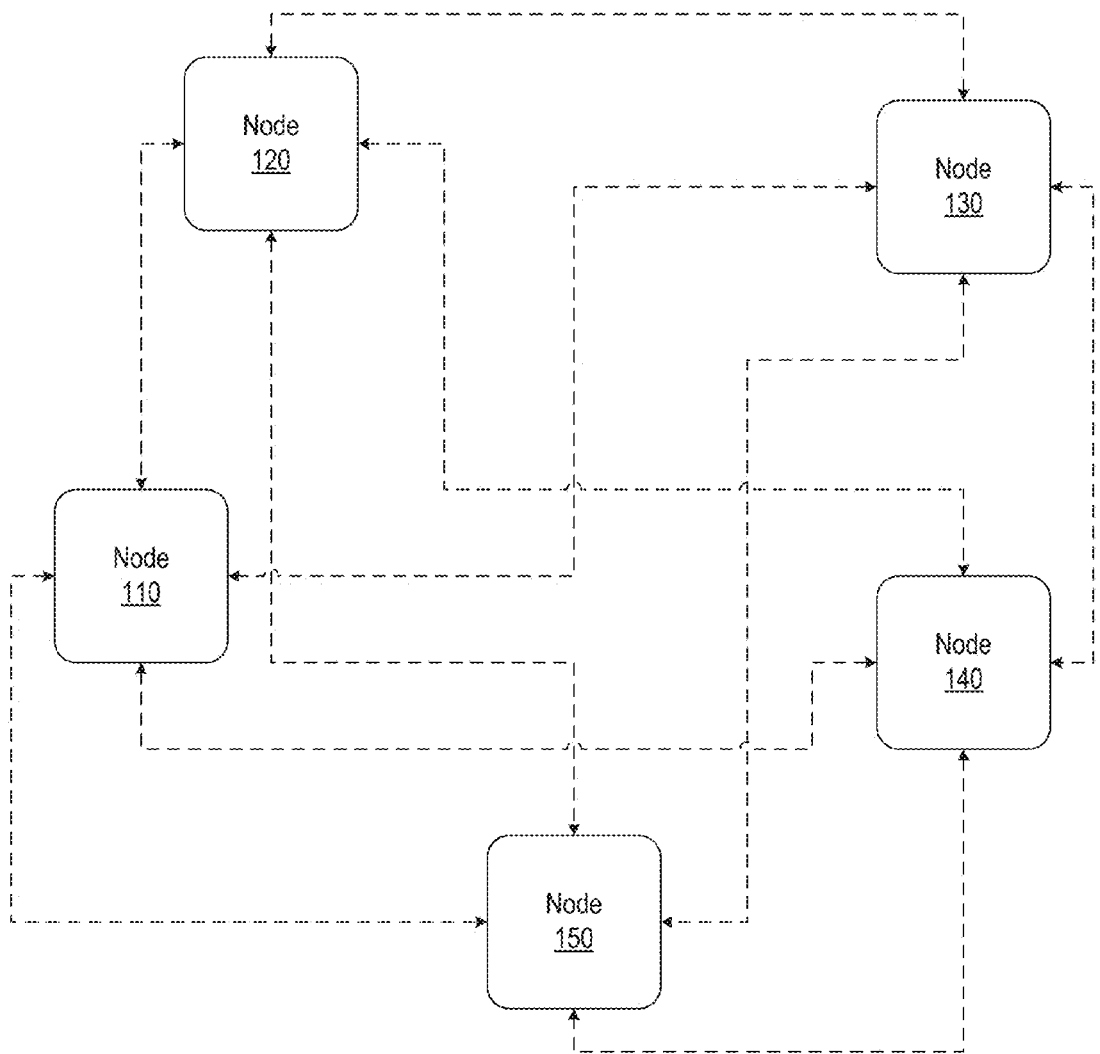
FIG. 1 is a block diagram illustrating a group of nodes in communication with each other for purpose of time synchronization, in accordance with some embodiments.

FIG. 1 is a block diagram illustrating a group of nodes in communication with each other for purpose of time synchronization, in accordance with some embodiments.

In various embodiments, one or more of the nodes in a group are in direct communication with all other nodes in the group. In various embodiments, one or more of the nodes are in direct communication only with a subset of the other nodes in the group.

In some embodiments, nodes 110, 120, 130, 140, and 150 ("the nodes") are configured to perform various tasks, at least some of which require the nodes to be substantially time synchronized with the other nodes in the group.

In some embodiments, each of the nodes is configured to attempt to remain in a substantial time synchronization with the other nodes by periodically transmitting and receiving time-related information to and from at least a subset of the other nodes. It should be noted that time synchronization may also be accomplished within subgroups of the nodes.

In some embodiments, each of the nodes is configured to implement, locally, a discrete logical oscillator in order to establish a time value for that node. Various types of oscillators may be used, including discretized oscillators implemented with one, two, or more state variables. An example of such an oscillator is the Van der Pol oscillator, which may be implemented using the following equations:

$$x_{1,new} = x_1 + x_2 \tau$$

$$x_{2,new} = x_2 + [\omega(1-x_1^2)x_2 - x_1]\tau \qquad \text{Equation(s) 1}$$

Time variable update equations for an example of a discrete Van der Pol oscillator where $x_1$ and $x_2$ are the oscillator's time variables, $x_{1,new}$ and $x_{2,new}$ are the oscillator's new, updated time variables, $\tau$ is the time between updates or sampling interval, and $\omega$ is the oscillator angular frequency/parameter. Van der Pol oscillators with other parameters may also be used. Other types of oscillators may also be used such as the Andronov-Hopf type of oscillators:

$$x_{1,new} = x_1 + [x_2 + x_1(1-x_1^2-x_2^2)]\omega\tau$$

$$x_{2,new} = x_2 + [-x_1 + x_2(1-x_1^2-x_2^2)]\omega\tau \qquad \text{Equation(s) 2}$$

Time variable update equations for an example of a discrete Andronov-Hopf oscillator where $x_1$ and $x_2$ are the oscillator's variables, $x_{1,new}$ and $x_{2,new}$ are the oscillator's new, updated variables, $\tau$ is the time between updates or sampling interval, and $\omega$ is the oscillator angular frequency/parameter.

In some implementations, the local logical oscillator in each node is implemented using timing information from a physical clock/oscillator located on each node. For example, $\tau$, the time between updates may be measured in terms of cycles from such a physical oscillator. Such physical oscillators typically drift in phase and/or frequency from corresponding physical clocks in other nodes. Accordingly, logical oscillators in each of the nodes may also drift in time compared to corresponding logical oscillators in the other nodes. Thus, the nodes may need to exchange time information in order to maintain time synchronization among the nodes, or at least among a subset of the nodes.

In some embodiments, the nodes may form a peer-to-peer network for sharing information, including timing information. The network may be formed using various types of protocols and mediums. For example, the nodes may establish a wireless communication using various types of wireless communication protocols (including optical or radio communication protocols), or the nodes may establish a wired communication using various types of wired communication protocols.

In some implementations, the nodes may operate independently and may each be configured to transmit the state information of the node's logical oscillators (such as the oscillators' time variables) to the other nodes. Each of the nodes may also be configured to observe and receive the state information from the other nodes.

It should be noted that, in some embodiments, a subset of the nodes may receive and/or transmit information only to another subset of the nodes in the group of nodes. For example, each node may be configured to receive and transmit information only from and to the node's nearest neighbors. It should also be noted that a node may be configured to transmit information to a certain subgroup of nodes and to receive information from another subgroup of nodes.

In some embodiments, it is not necessary to designate a certain node as a "server" or "master" in the network for the purpose of time synchronization. Accordingly, failure of one node (or even a subset of nodes) may not affect the time synchronization process for the other nodes.

In some embodiments, each node is configured to receive time information from one or more external nodes. The received time information indicates time values maintained by the one or more external nodes. These received time values are "external" time values from the perspective of the receiving node.

In some implementations, each of the external nodes is configured to transmit one or more of its time variables to the other nodes. The other nodes are configured to receive the one or more (external to them) time variables and adjust their corresponding local logical oscillators based at least upon the received external time variables. In some embodiments, the external nodes are capable of transmitting time information at multiple times during the external nodes' oscillation cycles.

In some implementations, each node may be configured to continue to receive external time information from various external nodes and to continue to adjust its own local time based at least upon the received external information. In some embodiments, nodes can adjust the intervals during which the nodes can transmit or even receive time synchronization information based upon hardware configuration, application requirements, power consumption, etc. It should be noted that certain nodes may be configured only to receive time information and synchronization from other nodes in the network; these certain nodes may not be configured to transmit time synchronization information to other nodes.

In some embodiments, a local node may be configured to determine a trustworthiness of an external node prior to using time information from that external node to adjust the local node's time information. Accordingly, a local node may, in some embodiments, avoid polluting the local node's time values with time information from a node that either is accidentally malfunctioning or was infiltrated and is executing malicious code, for example. The polluted time values may, in some embodiments, negatively affect not only the local node but also other nodes that may subsequently receive the polluted time values from the local node.

In some implementations, a node that is determined not to be trustworthy may still be permitted to time synchronize with the other nodes in the network by being allowed to receive time synchronization information from the other nodes.

In some implementations, the following logical oscillator and synchronization protocol relationships may be used by a group of nodes that are in active time synchronization with each other:

$$e_z = \hat{x}_1 - z_1$$

$$z_{1,new} = z_1 + [z_2 + rl_1|e_z|^{2/3} \text{sign}(e_z)]\tau_z$$

$$z_{2,new} = z_2 + [\omega_0(1-z_1^2)z_2 - z_1 + r^2 l_2 |e_z|^{1/3} \text{sign}(e_z)]\tau_z$$

$$z_{3,new} = z_3 + r^3 l_3 \text{sign}(e_z)\tau_z \quad \text{Equation(s) 3}$$

Time variable synchronization equations using a time variable from an external node where $z_{1,new}$ and $z_{2,new}$ are the updated local time variables of a local node that is receiving time information from an external node, $z_1$ and $z_2$ are the local time variables of the local node, $\tau_z$ is the time interval between messages from the external node, $\omega_0$ is a parameter of the local oscillator, and $r, l_i$ (i=1, 2, 3) are design parameters.

The $\hat{x}_1$ variable is the external time variable that is received from one of the external nodes and is indicative of an external time value at the external node. The $e_z$ variable is a measure of the difference between the external time variable and the local time variable. This difference is used in the local time variables update equations above in order to cause the local time variables to shift towards the external time variables and thus shift the local time value towards the external time value.

$z_3$ is a local variable that may be used in determining the trustworthiness of the external node. In some embodiments, $z_3$ may indicate the effort that the local node needs to exert in order to keep itself time synchronized with the external node. If the external node either was compromised or is malfunctioning, the local node may need to exert a higher effort to maintain a time synchronization with the external node. The opposite may be true for well-functioning external nodes: very little or no effort may be required by a local node to maintain time synchronization with the external node. Thus, the amount of effort may be used as an indicator of trustworthiness for an external node.

In some embodiments, alternative oscillator and synchronization protocols may be used, such as:

$$e = \hat{x}_1 - x_1$$

$$x_{1,new} = x_1 + [x_2 + rk_1|e|^{1/2} \text{sign}(e)]\tau_x$$

$$x_{2,new} = x_2 + [\omega_0(1-x_1^2)x_2 - x_1 + r^2 k_2 \text{sign}(e)]\tau_x \quad \text{Equation(s) 4}$$

Time variable alternative synchronization equations using a time variable from an external node where $x_{1,new}$ and $x_{2,new}$ are the updated local time variables, $x_1$ and $x_2$ are the local time variables, $\hat{x}_1$ is the external time variable of the external node, $\tau_x$ is the time interval between messages from the external node, $\omega_0$ is a parameter of the local oscillator, e is the error variable, and $r, k_i$ (i=1, 2, 3) are design parameters.

In yet other embodiments, synchronization protocols where two external variables are received may be used, such as:

$$e_1 = \hat{x}_1 - x_1$$

$$x_{1,new} = x_1 + [x_2 + r_1 k_1 |e_1|^{1/2} \text{sign}(e_1) + \xi_1]\tau_x$$

$$\xi_{1,new} = \xi_1 + [r_1^2 k_1 \text{sign}(e_1)]\tau_x$$

$$e_2 = \hat{x}_2 - x_2$$

$$x_{2,new} = x_2 + [\omega_0(1-x_1^2)x_2 - x_1 + r_2 k_1 |e_2|^{1/2} \text{sign}(e_2) + \xi_2]T_x$$

$$\xi_{2,new} = \xi_2 + [r_2^2 k_2 \text{sign}(e_2)]\tau_x \qquad \text{Equation(s) 5}$$

Time variable alternative synchronization and trustworthiness determination equations using two time variables from an external node where $x_{1,new}$ and $x_{2,new}$ are the updated local time variables, $x_1$ and $x_2$ are the local time variables, $\hat{x}_1$ and $\hat{x}_2$ are the external time variable of the external node $\xi_1$ and $\xi_2$ are auxiliary variables, $\tau_x$ is the time interval between messages from the external node, $\omega_0$ is a parameter of the local oscillator, $e_1$ and $e_2$ are the error variables, and $r_1$, $r_2$, $k_i$ (i=1, 2) are design parameters.

It should be noted that various other types of logical oscillator models may be used in each of the nodes. Accordingly, various other types of time synchronization models may be used at each of the nodes for time synchronizing with the other nodes. In some implementations, for example, instead of the logical oscillator being implemented with two state variables and two update equations, other numbers of equations and/or other numbers of state variables may be used. For example, the logical oscillator may be implemented with one second-order differential equation of one variable (and the variable's first and second order time derivatives).

In some embodiments, numerical differences (deltas) between one or more external time variables and one or more corresponding local time variables may be determined. In some embodiments, these deltas provide indications of the time differences between the local oscillator and the external oscillators. In some implementations, the local time variables may be corrected by amounts that are dependent on one or more of the deltas in order to shift the local time variables closer to the external time variables. For example, the local time variables may be gradually modified using adjustments that have linear, quadratic, or other nonlinear dependence on the deltas.

Figure 2:
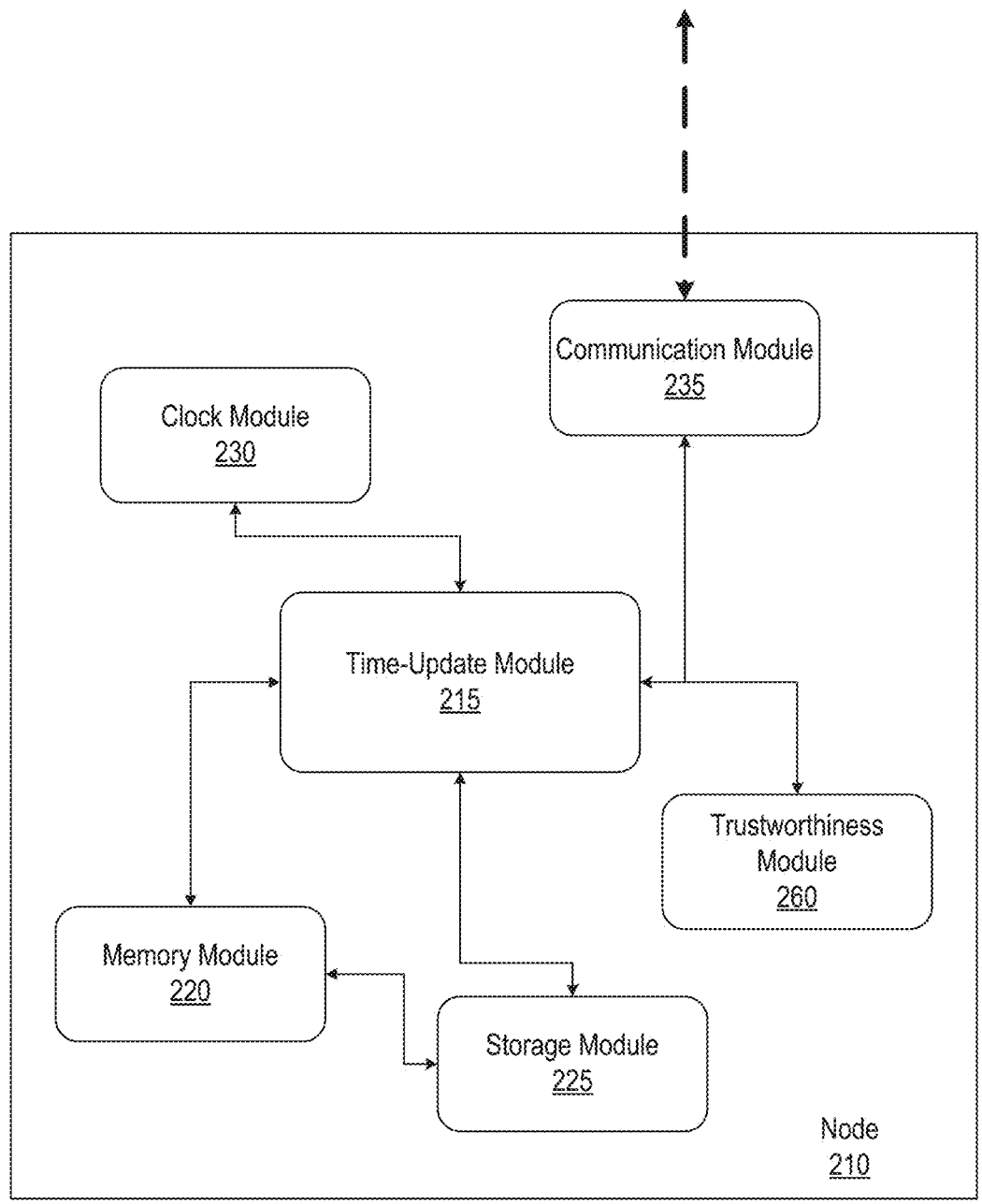
FIG. 2 is a block diagram illustrating a node configured to time synchronize with a group of other nodes, in accordance with some embodiments.

FIG. 2 is a block diagram illustrating a node configured to time synchronize with a group of other nodes, in accordance with some embodiments.

In some embodiments, node 210 represents an example of how one or more of the nodes shown in FIG. 1 may be implemented. It should be noted one or more additional components/units/modules may be included in each of the nodes and one or more of the components shown here may not be present in the nodes. In addition, it should be noted that one or more of the components/units/modules may be implemented in hardware, firmware, software or a combination of those. Furthermore, it should be noted that each of the one or more components may be implemented by one or more other units.

Time-update module 215 is configured to implement at least some of the functionality of node 210. Time-update module 215 is coupled to and is configured to exchange data with memory module 220 (which may include volatile memory) and storage module 225 (which may include non-volatile memory). In some embodiments, time-update module 215 is configured to implement and update a logical oscillator that may be used by node 210 to determine a local time value for the node.

Time-update module 215 may also be coupled to clock module 230, which is configured to provide a local reference time signal. The reference time signal may be used, for example, in the implementation of the logical oscillator. In various embodiments, a clock module can include a crystal oscillator, a resonant circuit, a voltage controlled oscillator (VCO), or other timing reference device.

Time-update module 215 may also be coupled to communication module 235, which is configured to communicate with one or more other nodes using one or more wired or wireless communication protocols.

In some embodiments, node 210 is configured to exchange timing information with one or more other nodes for maintaining time synchronization between the nodes. In some implementations, physical limitations in the clock modules of the various nodes may cause time values at the various nodes to differ from each other. Exchanging time information between the nodes may help maintain time synchronization between the nodes.

In some embodiments, time-update module 215 is configured to receive, through communication module 235, values of one or more first external time variables from a first external node and values of one or more second external time variables from a second external node. Time-update module 215 may be configured to adjust values of one or more local time variables based at least upon the values of the one or more first external time variables and the values of the one or more second external time variables. The local time variables may define the local logical oscillator, which is designed to define the local time value.

In some embodiments, trustworthiness module 260 is configured to determine a trustworthiness of an external node based at least upon the timing information received from the external node. In some implementations, time-update module 215 is configured to update the local time variables using external time variables from an external node only when trustworthiness module 260 determines that the trustworthiness of the external node is above a certain trustworthiness threshold.

Figure 3:
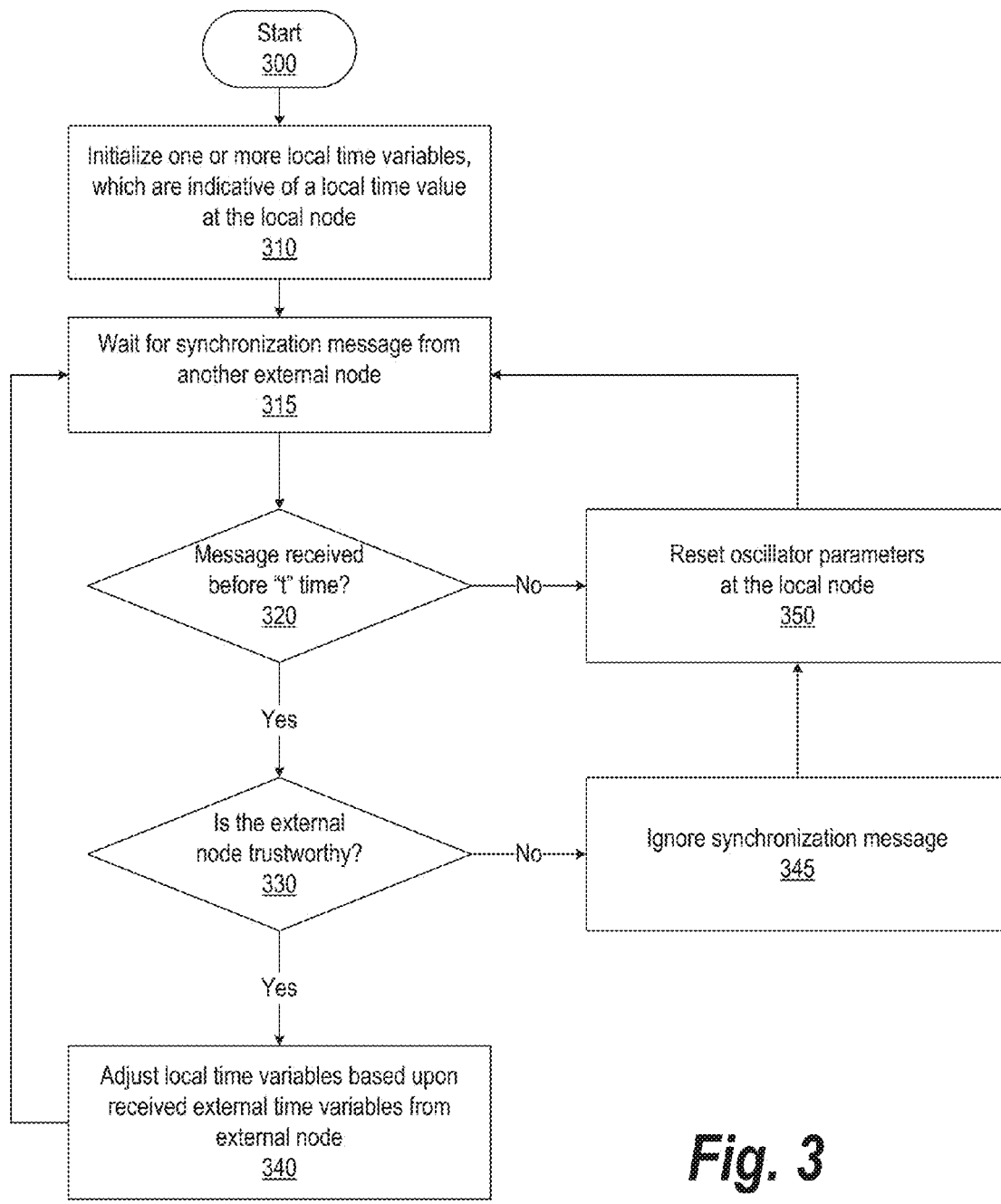
FIG. 3 is a flow diagram illustrating a method for time synchronizing a group of nodes, in accordance with some embodiments.

FIG. 3 is a flow diagram illustrating a method for time synchronizing a group of nodes, in accordance with some embodiments.

In some embodiments, the method described here may be implemented by one or more of the nodes shown in FIG. 1 and FIG. 2.

Processing begins at 300 where, at block 310, one or more local time variables at a local node are initialized. In some embodiments, the local time variables represent a logical local oscillator used by the local node to determine a local time value. The local time variables values and logical oscillator are based at least upon a local physical clock. A physical clock may generally drift in time compared to corresponding physical clocks on other nodes. Thus the local logical oscillator may require time synchronization with logical oscillators from other nodes.

At block 315, the local node waits for a synchronization message to be received from another external node, and at decision 320, a determination is made as to whether a synchronization message is received within a time period "t". In some embodiments, the value of t may be related to the dynamics of the local logical oscillator. For example, the value of t may be chosen to be less than half the period of the local logical oscillator.

If the message is not received by the "t" time period, decision 320 branches to the "no" branch where at block 350 where at least some of the local oscillator parameters are reset. Examples of such parameters are the parameter r from Equation(s) 4 and the parameters $r_1$, $r_2$ from Equation(s) 5. In some embodiments, when no messages are received within the t interval, parameters r, $r_1$, $r_2$ may be set to zero. Setting these parameters to zero, in some implementations of the local oscillators, may be equivalent to evolving the local oscillators using only the internal, local model. When and if an update message is received, parameters may be assigned values different from zero and the information received from the external node(s) may be taken into account to update the local oscillators models. Processing subsequently returns to block 315 where the local node waits for another synchronization message.

On the other hand, if the message is received within a "t" amount of time, decision 320 branches to the "yes" branch where, at decision 330, another determination is made as to whether the external node is trustworthy. As previously discussed, various methods may be implemented for determining the trustworthiness of an external node. Time information could possibly be received from an untrustworthy node and thus, in some embodiments, this time information is not to be used in updating the time information at the local node.

If the external node is found not to be trustworthy, decision 330 branches to the "no" branch where, at block 345, the synchronization message is ignored. Processing subsequently continues at block 350 where the local oscillator parameters are reset and then to block 315 where the local node waits for another synchronization message.

On the other hand, if the external node is found to be trustworthy, decision 330 branches to the "yes" branch where, at block 340, local time variables are adjusted based at least upon the received external time variables from the external node that were included with the received synchronization message. In various implementations, the adjustments are using the update definitions in Equation(s) 3, Equation(s) 4, or Equation(s) 5 presented above.

Processing subsequently returns to block 315 where the local node waits for another synchronization message.

Figure 4:
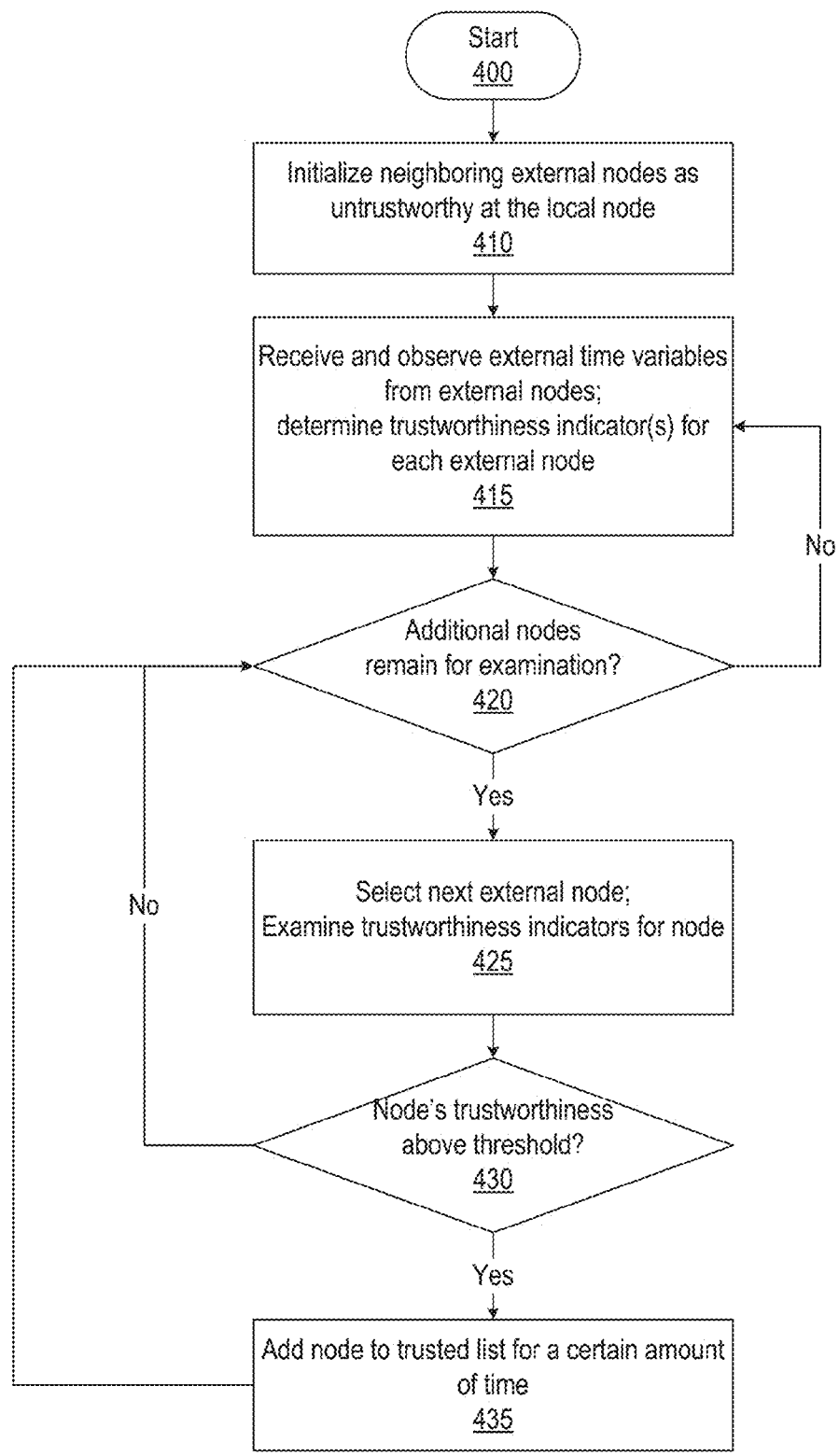
FIG. 4 is a flow diagram illustrating a method for determining trustworthiness in a group of nodes, in accordance with some embodiments.

FIG. 4 is a flow diagram illustrating a method for determining trustworthiness in a group of nodes, in accordance with some embodiments.

In some embodiments, the method described here may be implemented by one or more of the nodes shown in FIG. 1 and FIG. 2.

Processing begins at 400 where, at block 410, neighboring external nodes are initialized as untrustworthy at the local node. In some embodiments, the neighboring external nodes belong to a group of nodes from which the local node is configured to receive time information. The local node may use the received time information from the external nodes in order to update the time at the local node. Accordingly, the local node is configured to determine the trustworthiness of the external nodes prior to using time information from the external nodes to update local time information. In some embodiments, if an external node is determined to be untrustworthy, then that external node can be ignored: the local node does not use time information from the external node to update time information at the local node.

At block 415, external time variables are received from external nodes. The external time variables from an external node are indicative of an external time value at the external node. Using the received external time variables, trustworthiness indicators are then determined for each external node. Various methods may be used to determine the trustworthiness indicator(s). For example, various embodiments may use a variable, such as $z_3$ from Equation(s) 3 above, as an indicator of the trustworthiness of information received from a corresponding external node.

A determination is then made, at decision 420, as to whether additional nodes remain for trustworthiness examination. If no additional nodes remain, decision 420 branches to the "no" branch where processing returns to block 415 where additional external time variables are received from external nodes for additional processing.

On the other hand, if additional external nodes remain for examination, decision 420 branches to the "yes" branch where, at block 425, the next external node is selected. The external time variables received from that external node are analyzed to determine trustworthiness indicators for that external node.

At decision 430, a determination is made as to whether the external node's trustworthiness indicator(s) are above a certain threshold. If the external node's trustworthiness is not above the threshold, decision 430 branches to the "no" branch returning to decision 420 for the processing of additional external nodes.

In some embodiments, the trustworthiness indicators may be used in determining weighting factors for the time updates. For examples, trustworthy nodes may be given weights that are close to 1 when being used for time updates, and untrustworthy nodes may be given weights that are close to 0 when being used for time updates.

On the other hand, if the external node's trustworthiness is above the threshold, decision 430 branches to the "yes" branch where, at block 435, the external node is added to the trusted list of external nodes for at least a certain amount of time. This "trusted duration" period may be set based on an expected amount of time for which a node is expected to be reliable. For example, this period may be a fraction of a second, a few seconds, a few minutes, a few hours, a few days, etc. depending on the expected reliability of the hardware and/or software.

Subsequently, processing returns to decision 420 for the processing of additional external nodes.

Figure 5:
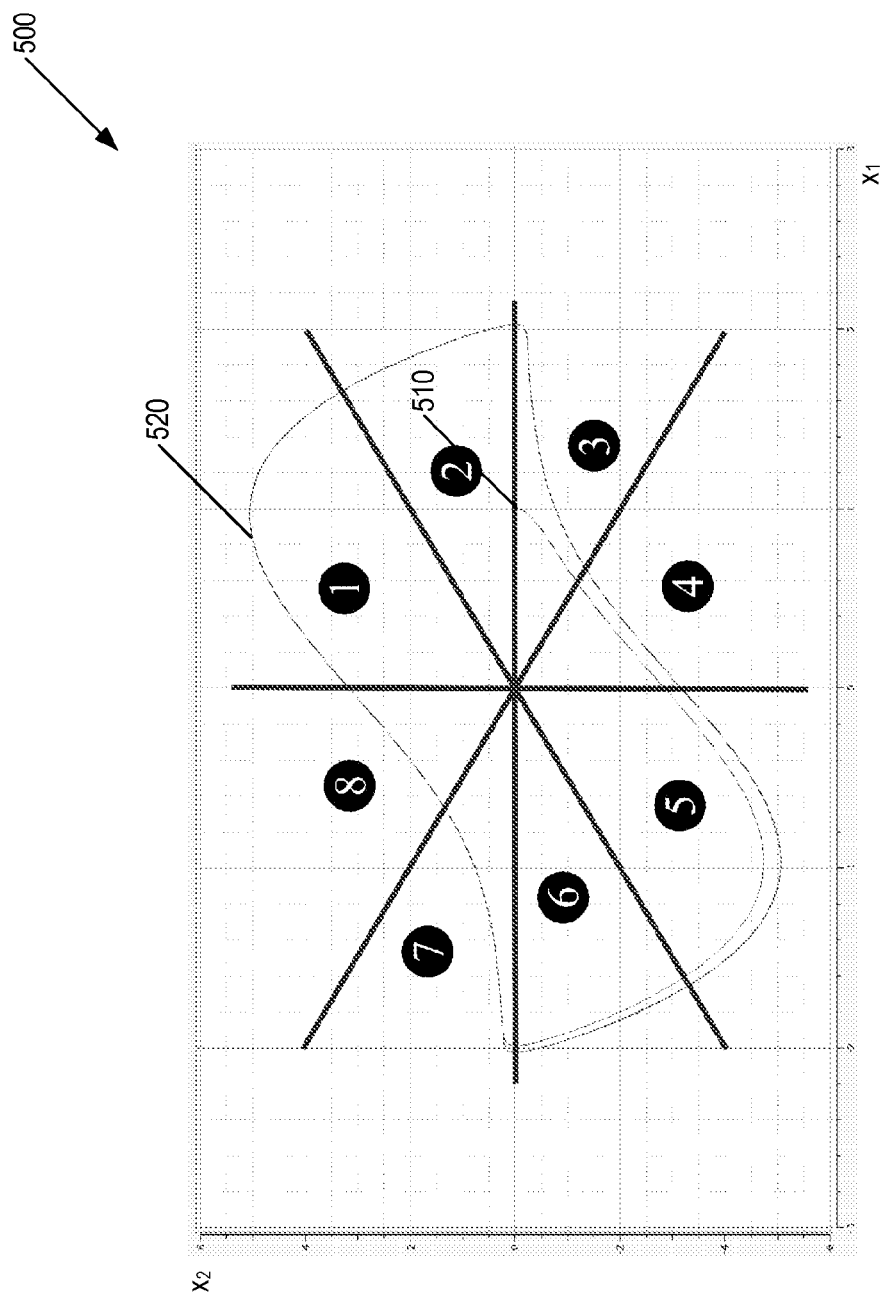
FIG. 5 is a graph illustrating an example of a phase plot for a Van der Pol oscillator, in accordance with some embodiments.

FIG. 5 is a graph illustrating an example of a phase plot for a Van der Pol oscillator, in accordance with some embodiments.

Graph 500 is a phase plot of the first variable, $x_1$, against the second variable, $x_2$, of a Van der Pol logical oscillator. For example, the plot may be generated using the Equation(s) 1 presented above for the variables $x_1$ and $x_2$.

The oscillator represented by graph 500 (and Equation(s) 1) is an example of an oscillator that may be used by any of the nodes shown in FIG. 1 to implement a local logical clock to determine local time at the node. In this example, the oscillator path begins at location 510 and then within the first cycle settles at stable path 520.

As was previously noted, various types of oscillators having various types of parameters may be used to implement clocks in the nodes.

Figure 6:
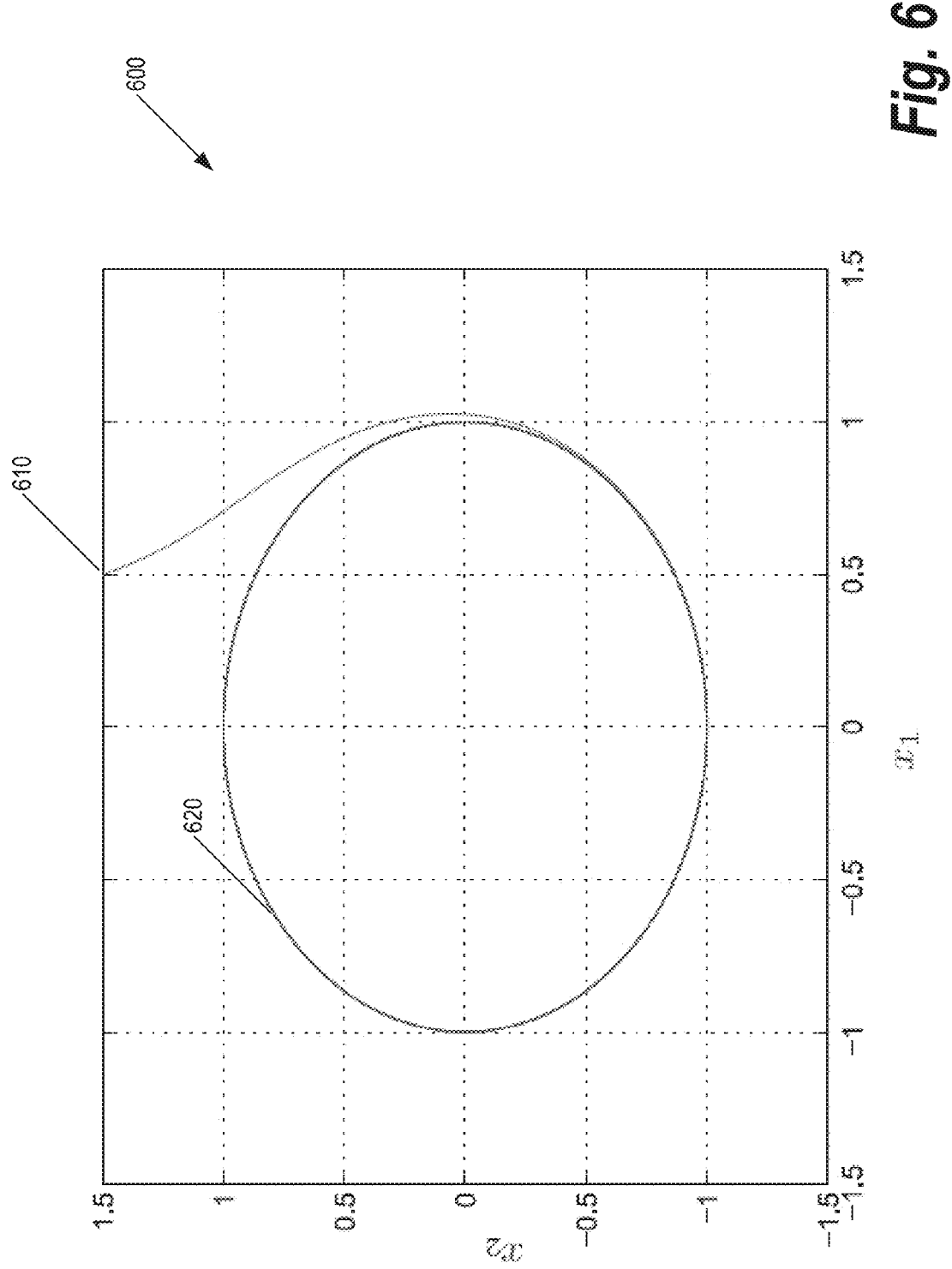
FIG. 6 is a graph illustrating an example of a phase plot for an Andronov-Hopf oscillator, in accordance with some embodiments.

FIG. 6 is a graph illustrating an example of a phase plot for an Andronov-Hopf oscillator, in accordance with some embodiments.

Graph 600 is a phase plot of the first variable, $x_1$, against the second variable, $x_2$, of the Andronov-Hopf oscillator. For example, the plot may be generated using variables from Equation(s) 2 presented above.

The oscillator represented by graph 600 (and Equation(s) 2) is an example of an oscillator that may be used by any of the nodes shown in FIG. 1 to implement a local logical clock to determine a local time at the node. In this example, the oscillator path begins at location 610 and then within the first cycle settles at stable path 620.

As was previously noted, various types of oscillators having various types of parameters may be used to implement clocks in the nodes.

Figure 7:
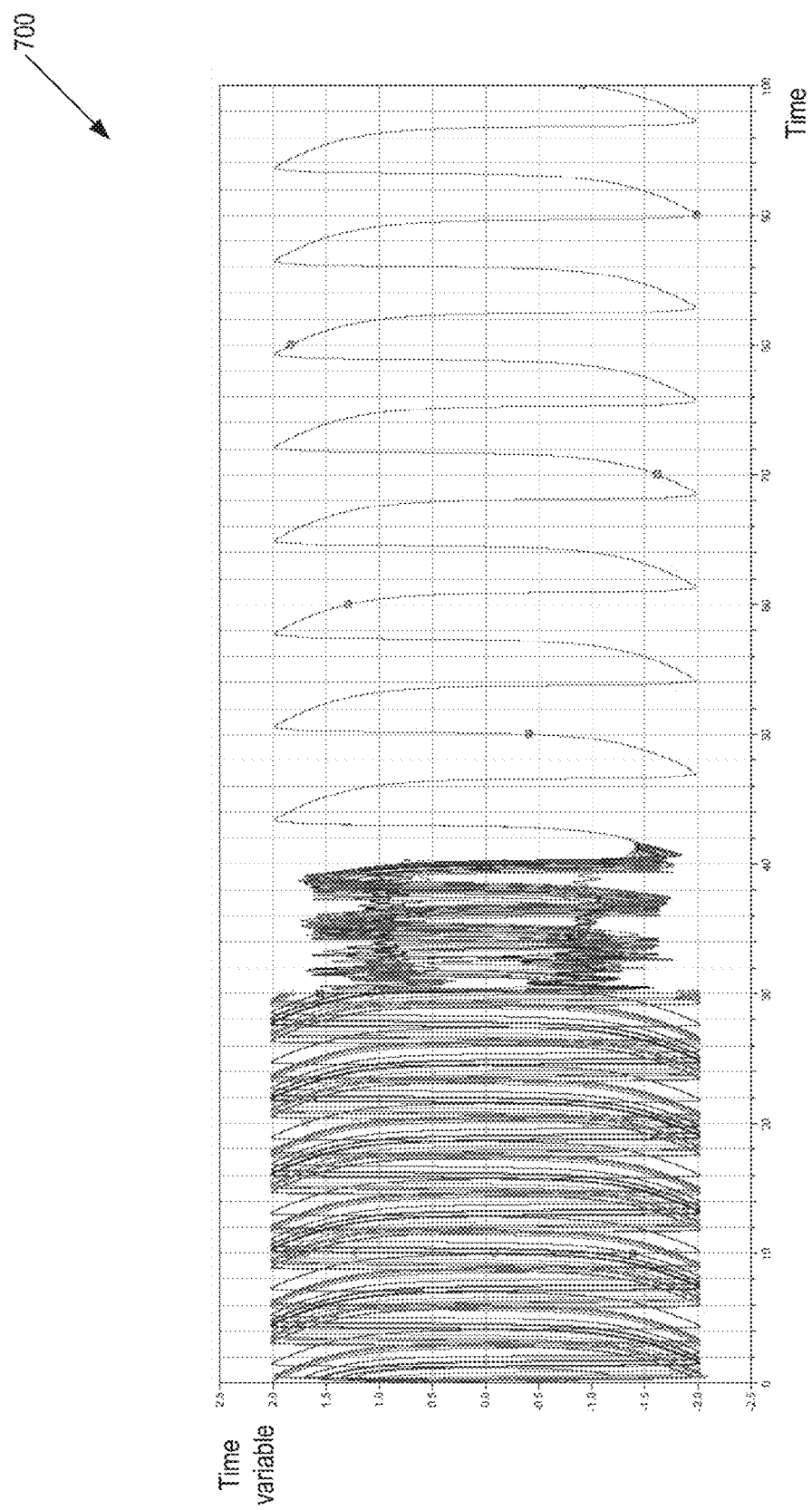
FIG. 7 is a graph illustrating the synchronization of time variables for Van der Pol oscillators of several different nodes over time, in accordance with some embodiments.

FIG. 7 is a graph illustrating the synchronization of time variables for Van der Pol oscillators of several different nodes over time, in accordance with some embodiments.

Graph 700 shows a plot of one of the time variables each of several independent Van der Pol oscillators from a group of nodes against time. In this example, 20 nodes (similar to the nodes shown in FIG. 1) were used in a circular network topology. The oscillator of each node was initialized at random, and a synchronization was started for all the nodes by time 30. As can be seen by graph 700, time synchronization between all the nodes was reached by time 42. In this example, the time synchronization was achieved using interactive feedback among nodes as described in Equation(s) 3, presented above.

Figure 8:
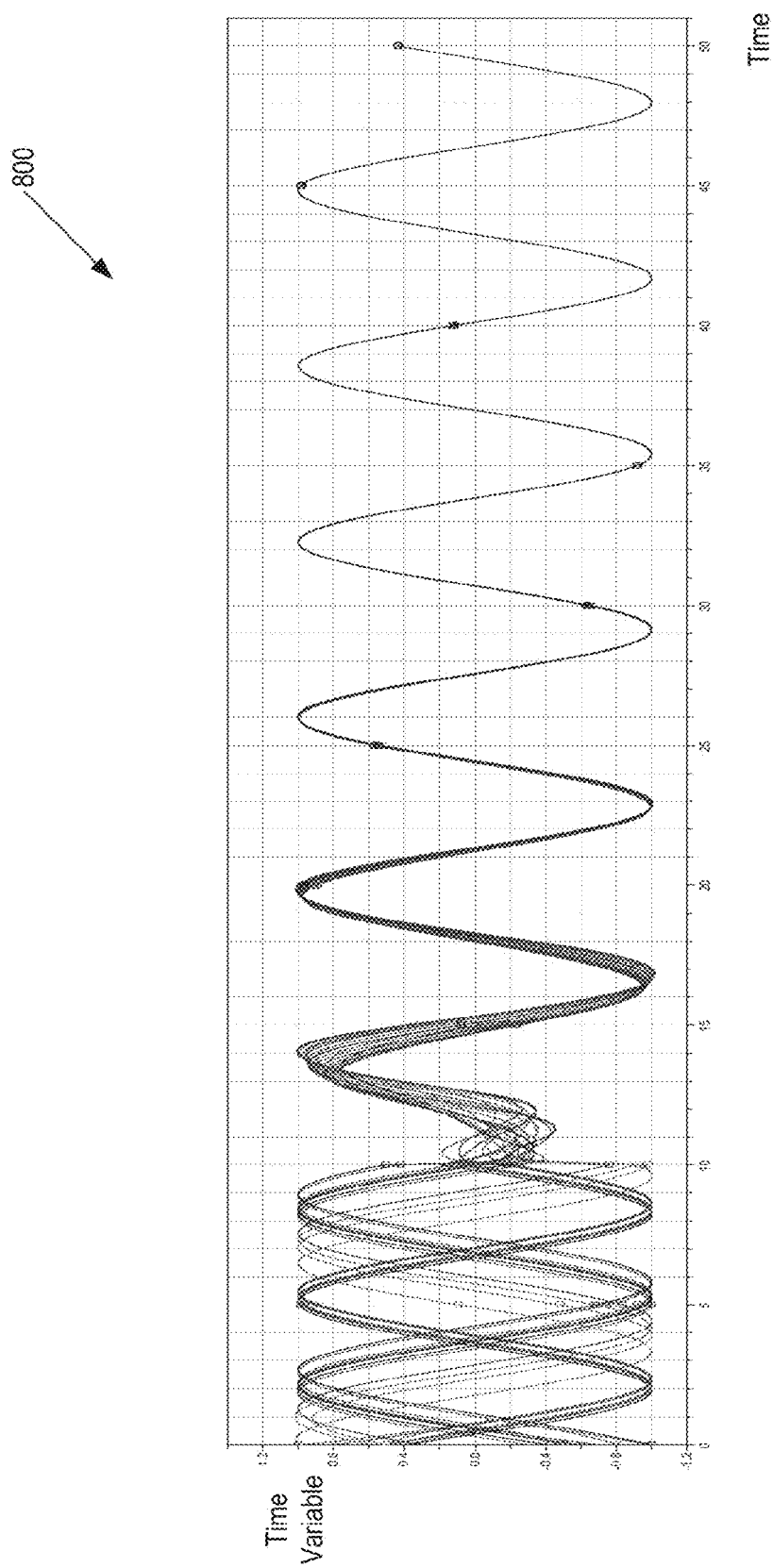
FIG. 8 is a graph illustrating the synchronization of time variables for Andronov-Hopf oscillators of several different nodes over time, in accordance with some embodiments.

FIG. 8 is a graph illustrating the synchronization of time variables for Andronov-Hopf oscillators of several different nodes over time, in accordance with some embodiments.

Graph 800 shows a plot of one of the time variables each of several independent Andronov-Hopf oscillators from a group of nodes against time. In this example, 20 nodes (similar to the nodes shown in FIG. 1) were used in a circular network topology. The oscillator of each node was initialized at random, and a synchronization was started for all the nodes by time 10. As can be seen by graph 800, time synchronization between all the nodes was reached by time 30. In this example, the time synchronization was achieved using interactive feedback among nodes as described in the equations below:

$$e = \hat{x}_1 - x_1$$

$$x_{1,new} = x_1 + [x_2 + x_1(1 - x_1^2 - x_2^2) + rk_1|e|^{1/2}\operatorname{sign}(e)]\omega\tau_x$$

$$x_{2,new} = x_2 + [-x_1 + x_2(1 - x_1^2 - x_2^2) + r^2 k_2 \operatorname{sign}(e)]\omega\tau_x \quad \text{Equation(s) 6}$$

Time variable update equations for an example of a discrete Andronov-Hopf oscillator where $x_1$ and $x_2$ are the oscillator's variables, $x_{1,new}$ and $x_{2,new}$ are the oscillator's new, updated variables, $\tau_x$ is the time between updates or sampling interval, and $\omega$ is the oscillator angular frequency/parameter. $\omega$ is a parameter of the local oscillator, and r, $k_i$ (i=1, 2) are design parameters.

The $\hat{x}_1$ variable is the external time variable that is received from one of the external nodes and is indicative of an external time value at the external node. The e variable is a measure of the difference between the external time variable and the local time variable. This difference is used in the local time variables update equations above in order to cause the local time variables to shift towards the external time variables and thus shift the local time value towards the external time value.

FIG. 9 includes graphs illustrating a comparison of time variables for one node observing another node and the effort required for synchronization by the observing node, in accordance with some embodiments.

Graph 910 is a plot against time of an external time variable of an external node and a local time variable of a local node. In this example, the local node and the external node are both configured to operate using the same type of logical oscillators having the same parameters. The local node is configured to observe the external node (by receiving time information from the external node) for the purpose of maintaining time synchronization with the external node. As can be seen by the graph, the local time variable is initialized with a different phase compared to the external variable but quickly matches the external time variable in phase and frequency.

Graph 920 is a plot against time of the "effort" required by the local node to observe and match its phase and frequency to the external node. As can be seen by the graph, some effort is initially required by the local node as the time synchronization begins. But this effort quickly settles to zero as the local node matches its phase and frequency to the external node.

In some embodiments, the effort (or the magnitude/absolute value of the effort variable) may be an indication of the trustworthiness of the external node. For example, if the external node is compromised, either accidentally or through a malicious attack, the external node's oscillator may no longer implement the same model as the local node. Accordingly, a greater effort may be required by the local node to remain in phase with the external node, an indication that the external node may no longer be trustworthy.

FIG. 10 includes graphs illustrating a comparison of time variables for one node observing another node and the effort required for synchronization by the observing node where the two nodes have different oscillator models, in accordance with some embodiments.

Graph 1010 is a plot against time of an external time variable of an external node and a local time variable of a local node. In this example, the local node and the external node are both configured to operate with the same type of oscillators but the two oscillators have different parameters. The local node is configured to observe the external node (by receiving time information from the external node) for the purpose of time synchronization with the external node. As can be seen by the graph, the local time variable is initialized with a different phase compared to the external variable but in time matches the external time variable in phase and frequency.

Graph 1020 is a plot against time of the "effort" required by the local node to observe and match its phase and frequency to the external node. As can be seen by the graph, some effort is initially required by the local node, and the amount of effort required remains relatively high even after the local node matches its phase and frequency to the external node.

In some embodiments, the effort may be an indication of the trustworthiness of the external node. For example, if the external node is compromised, either accidentally or through a malicious attack, the external node's oscillator may no longer implement the same model as the local node. As is the case in this example, some significant ongoing effort is required by the local node to remain in phase with the external node, even after the local node matches the external node in phase and frequency. This substantial effort may be understood as an indicator that the external node is not trustworthy for time synchronization purposes.

FIG. 11 is a block diagram illustrating a processor, in accordance with some embodiments.

FIG. 11 illustrates a processor core 1100 according to one embodiment. Processor core 1100 may be the core for any type of processor, such as a micro-processor, an embedded processor, a digital signal processor (DSP), a network processor, or other device to execute code. Although only one processor core 1100 is illustrated in FIG. 11, a processing element may alternatively include more than one of the processor core 1100 illustrated in FIG. 11. Processor core 1100 may be a single-threaded core or, for at least one embodiment, the processor core 1100 may be multithreaded in that it may include more than one hardware thread context (or "logical processor") per core.

FIG. 11 also illustrates a memory 1170 coupled to the processor 1100. The memory 1170 may be any of a wide variety of memories (including various layers of memory hierarchy) as are known or otherwise available to those of skill in the art. The memory 1170 may include one or more code instruction(s) 1113 to be executed by the processor 1100 core. The processor core 1100 follows a program sequence of instructions indicated by the code 1113. Each instruction enters a front end portion 1110 and is processed by one or more decoders 1120. The decoder may generate as its output a micro operation such as a fixed width micro operation in a predefined format, or may generate other instructions, microinstructions, or control signals, which reflect the original code instruction. The front end 1110 also includes register renaming logic 1125 and scheduling logic 1130, which generally allocate resources and queue the operation corresponding to the convert instruction for execution.

The processor 1100 is shown including execution logic 1150 having a set of execution units 1155-1, 1155-2, through 1155-N. Some embodiments may include a number of execution units dedicated to specific functions or sets of functions. Other embodiments may include only one execution unit or one execution unit that can perform a particular function. The execution logic 1150 performs the operations specified by code instructions.

After completion of execution of the operations specified by the code instructions, back end logic 1160 retires the instructions of the code 1113. In one embodiment, the processor 1100 allows out of order execution but requires in order retirement of instructions. Retirement logic 1165 may take a variety of forms as known to those of skill in the art (e.g., re-order buffers or the like). In this manner, the processor core 1100 is transformed during execution of the code 1113, at least in terms of the output generated by the decoder, the hardware registers and tables utilized by the register renaming logic 1125, and any registers (not shown) modified by the execution logic 1150.

Although not illustrated in FIG. 11, a processing element may include other elements on chip with the processor core 1100. For example, a processing element may include memory control along with the processor core 1100. The processing element may include I/O control logic and/or may include I/O control logic integrated with memory control logic. The processing element may also include one or more caches.

In some embodiments, code 1113 may be configured to cause/facilitate the reception, from at least a first external node and a second external node, of values of one or more first external time variables from the first external node and values of one or more second external time variables from the second external node. Furthermore, code 1113 may be configured to cause/facilitate the adjustment values of one or more local time variables based at least upon the values of the one or more first external time variables and the values of the one or more second external time variables. Accordingly, code 1113 may be suitable to cause the transformation of registers or memory elements that correspond to the state variables of a logical oscillator undergoing a time synchronization procedure.

FIG. 12 is a block diagram illustrating a node including a system-on-chip, in accordance with some embodiments.

In some embodiments, node 1210 represents an alternative example of how one or more of the nodes shown in FIG. 1 may be implemented. It should be noted one or more additional components/units may be included in each of the nodes and one or more of the components shown here may not be present in the nodes. In addition, it should be noted that one or more of the components may be implemented in hardware, firmware, software or a combination of those. Furthermore, it should be noted that each of the one or more components may be implemented by one or more other units.

Node 1210 may include system-on-chip (SoC) 1250, which may be generally designed as a single integrated circuit package. In some implementations, SoC 1250 may be fabricated on a single semiconductor wafer substrate. In various examples, node 1210 may be constructed to include various SOC designs and manufacturing methods to create effectively a small computing system. Among other units, SoC 1250 may include processing units 1215, memory units 1220, storage units 1225, graphics processing units 1227, physical oscillator 1230, and communication units 1235. It should be noted that in other implementations, one or more of the various devices and modules in SoC 1250 may be fabricated on separate semiconductor wafer substrates. For example, physical oscillator 1230 may, in some implementations, reside on one or more separate semiconductor packages.

Additionally, node 1210 may also include one or more cameras 1260 for capturing images/video, one or more microphones 1265 for capturing audio, one or more antennas 1270 for facilitating electromagnetic transmission/reception for communication, one or more speakers 1275 for outputting audio, one more touchscreens 1280 for outputting images/video and receiving user input, and one or more keyboards and mice 1285 for receiving user input. Furthermore, node 1210 may include one or more sensors such as location sensors, proximity sensors, light sensors, accelerometers, magnetic sensors, pressure sensors, temperature sensors, biometric security sensors, etc.

Processing units 1215 are configured to execute instructions in order to implement the functionality of node 1210. Processing units 1215 are coupled to and are configured to exchange data with volatile memory units 1220 and non-volatile storage units 1225. In some embodiments, processing units 1215 are configured to implement a logical oscillator that may be used by node 1210 to determine a local time value for the node.

Processing units 1215 are also coupled to physical oscillators 1230, which are configured to provide a local reference time signal. The reference time signal may be used, for example, in the implementation of the logical oscillator. In various embodiments, a physical oscillator can include a crystal oscillator, a resonant circuit, a voltage controlled oscillator (VCO), or other timing reference device.

Processing units 1215 are also coupled to communication units 1235, which are configured to communicate with one or more other nodes using one or more wired or wireless communication protocols.

In some embodiments, node 1210 is configured to exchange timing information with one or more other nodes for maintaining a time synchronization between the nodes. In some implementations, physical limitations in the physical oscillators of the various nodes may cause time values at the various to differ from each other. Exchanging time information between the nodes may help maintain time synchronization between the nodes.

In some embodiments, instructions/software code may be stored in a combination of non-volatile/volatile memory such as storage units 1225 and memory units 1220. The instructions may be configured to be processed by processor 1215 in order to facilitate at least some of the functionality of node 1210. For example, the instructions may cause node 1210 to transform and to receive from at least a first external node and a second external node, values of one or more first external time variables from the first external node and values of one or more second external time variables from the second external node. Furthermore, the instructions may be configured to cause node 1210 to transform and to adjust values of one or more local time variables of the node 1210 based at least upon the values of the one or more first external time variables and the values of the one or more second external time variables.

In some embodiments, node 1210 may be a portable device, such as a mobile phone, a smartphone with a touchscreen, a tablet, a laptop, a hybrid device, other communication device, etc. And in some embodiments, node 1210 may be configured to communicate with other such nodes in order to exchange time synchronization information with these other nodes.

Example 1 may include a node that is configured to time synchronize with other nodes. The node may include a communication module configured to receive values of one or more first external time variables from a first external node and values of one or more second external time variables from a second external node. The node may also include a local time-update module coupled to the communication module. The time-update module may be configured to adjust values of one or more local time variables based at least upon the values of the one or more first external time variables and the values of the one or more second external time variables.

Example 2 may include the node of example 1, and may also include a local clock module. The values of the one or more local time variables may be based at least upon values obtained from the local clock module. The values of the one or more first external time variables may be based at least upon a first external clock module at the first external node. The values of the one or more second external time variables may be based at least upon a second external clock module at the second external node. The local clock module, the first external clock module, and the second external clock module may drift over time from each other in phase and/or frequency.

Example 3 may include the node of example 1 or 2, with the values of the one or more first external time variables being indicative of a first external time value of the first external node. The values of the one or more second external time variables may be indicative of a second external time value of the second external node, and wherein the values of the one or more local time variables are indicative of a local time value of the node.

Example 4 may include the node of example 3, with a first time of reception of the first external time variables being independent of a first phase of the first time, and a second time of reception of the second external time variables being independent of a second phase of the second time.

Example 5 may include the node of example 3 or 4, configured so that adjusting the values of the one or more local time variables causes the local time value to shift closer to the first external time value and/or closer to the second external time value.

Example 6 may include the node of example 3, or 4, or 5, with the communication module being configured to transmit values of the one or more local time variables. Another external node of a set of external nodes may be configured to receive the values of the one or more local time variables, and adjust values of one or more other external time variables of the other external node based at least upon the values of the one or more local time variables. The values of the one or more other external time variables may be indicative of another external time value of the other external time node.

Example 7 may include the node of example 3, or 4, or 5, or 6, with the local time variables indicating a state of a local logical oscillator designed to define the local time value, the first external time variables indicating a state of a first external logical oscillator designed to define the first external time value, and the second external time variables indicating a state of a second external logical oscillator designed to define the second external time value.

Example 8 may include the node of any of examples 1-7, and may also include a trustworthiness module configured to determine a first trustworthiness of the first external node and a second trustworthiness of the second external node. The local time-update module may be configured to adjust the values of the one or more local time variables based upon the first trustworthiness and the second trustworthiness.

Example 9 may include the node of any of examples 1-8, where a first act of transmitting the first external time variables by the first external node may be independent of the first external time value, and a second act of transmitting the second external time variables by the second external node may be independent of the second external time value.

Example 10 may include a method for time-synchronizing nodes. The method may include receiving, at a local node, values of one or more first external time variables from a first external node and values of one or more second external time variables from a second external node; and adjusting, by a software local time-update module executing on one or more processing units, values of one or more local time variables of the local node based at least upon the values of the one or more first external time variables and the values of the one or more second external time variables.

Example 11 may include the method of example 10 with the values of the one or more local time variables being based at least upon values obtained from a local physical oscillator at the local node. The values of the one or more first external time variables may be based at least upon a first external physical oscillator at the first external node. The values of the one or more second external time variables may be based at least upon a second external physical oscillator at the second external node. The local physical oscillator, the first external physical oscillator, and the second external physical oscillator may drift over time from each other in at least one of phase or frequency.

Example 12 may include the method of example 10 or 11, with the values of the one or more first external time variables being indicative of a first external time value of the first external node. The values of the one or more second external time variables may be indicative of a second external time value of the second external node, and the values of the one or more local time variables may be indicative of a local time value of the local node.

Example 13 may include the method of example 12, with a first time of reception of the first external time variables being independent of a first phase of the first time, and a second time of reception of the second external time variables being independent of a second phase of the second time.

Example 14 may include the method of example 12 or 13 where adjusting the values of the one or more local time variables may cause the local time value to shift closer to the first external time value or closer to the second external time value.

Example 15 may include the method of example 12 or 13, or 14, and may also include transmitting, from the local node, values of the one or more local time variables. Another external node of a set of external nodes may be configured to receive the values of the one or more local time variables and adjust values of one or more other external time variables of the other external node based at least upon the values of the one or more local time variables. The values of the one or more other external time variables may be indicative of another external time value of the other external time node.

Example 16 may include the method of example 12 or 13, or 14 or 15, with the local time variables indicating a state of a local logical oscillator designed to define the local time value, the first external time variables indicating a state of a first external logical oscillator designed to define the first external time value, and the second external time variables indicating a state of a second external logical oscillator designed to define the second external time value.

Example 17 may include the method of any of examples 10-16, and may also include determining a first trustworthiness of the first external node and a second trustworthiness of the second external node and adjusting the values of the one or more local time variables based upon the first trustworthiness and the second trustworthiness.

Example 18 may include the method of any of examples 10-17, with a first act of transmitting the first external time variables by the first external node being independent of the first external time value, and a second act of transmitting the second external time variables by the second external node being independent of the second external time value.

Example 19 may include at least one non-transitory, machine-accessible storage medium having instructions stored thereon, with the instructions being configured, when executed on a machine, to cause the machine to perform a method as described in any of examples 10-18.

Example 20 may include an apparatus configured to time synchronize, the apparatus including means for performing the method of any of examples 10-18.

One or more embodiments of the invention are described above. It should be noted that these and any other embodiments are exemplary and are intended to be illustrative of the invention rather than limiting. While the invention is widely applicable to various types of systems, a skilled person will recognize that it is impossible to include all of the possible embodiments and contexts of the invention in this disclosure. Upon reading this disclosure, many alternative embodiments of the present invention will be apparent to persons of ordinary skill in the art.

Those of skill will appreciate that the various illustrative logical blocks, modules, circuits, and steps described in connection with the embodiments disclosed herein may be implemented as hardware, firmware, software, or combinations of those. To illustrate clearly this interchangeability of hardware, firmware, and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A node to time synchronize with other nodes, the node comprising:
    a processor;
    a communication module operated by the processor, to receive first values of one or more first external oscillator variables from a first external peer node and second values of one or more second external oscillator variables from a second external peer node, wherein the first and second values of one or more first and second external oscillator variables respectively represent oscillator state information of a first logical oscillator of the first external peer node and a second logical oscillator of the second external peer node;
    a local time-update module operated by the processor, coupled to the communication module, wherein the time-update module is to determine whether the first and second values of the one or more first and second external oscillator variables are received before a time threshold, and on determination that the first and second values of the one or more first and second external oscillator variables are received before the time threshold, adjust values of one or more local oscillator variables that represent local oscillator state information of a local logical oscillator based at least upon the first values of the one or more first external oscillator variables and the second values of the one or more second external oscillator variables;
    a trustworthiness module operated by the processor, to determine a first trustworthiness of the first external peer node and a second trustworthiness of the second external peer node based upon the first external oscillator variables and the second external oscillator variables;

wherein the local time-update module is to adjust the values of the one or more local oscillator variables based upon weighting factors applied to the first external oscillator variables and the second external oscillator variables based on the determined first trustworthiness and the determined second trustworthiness, wherein the weighting factors are between zero and one.

2. The node of claim 1, further comprising a local clock module operated by the processor,
wherein the values of the one or more local oscillator variables are based at least upon values obtained from the local clock module,
wherein the first values of the one or more first external oscillator variables are based at least upon a first external clock module at the first external peer node,
wherein the second values of the one or more second external oscillator variables are based at least upon a second external clock module at the second external peer node, and
wherein the local clock module, the first external clock module, and the second external clock module drift over time from each other in at least one of phase or frequency.

3. The node of claim 1,
wherein the first values of the one or more first external oscillator variables are indicative of a first external time value of the first external peer node,
wherein the second values of the one or more second external oscillator variables are indicative of a second external time value of the second external peer node, and
wherein the values of the one or more local oscillator variables are indicative of a local time value of the node.

4. The node of claim 3, wherein:
a first time of reception of the first external oscillator variables is independent of a first phase of the first time, and
a second time of reception of the second external oscillator variables is independent of a second phase of the second time.

5. The node of claim 3, wherein the adjusting the values of the one or more local oscillator variables causes the local time value to shift closer to at least one of the first external time value or the second external time value.

6. The node of claim 3, wherein:
the communication module is to transmit values of the one or more local oscillator variables,
wherein another external node of a set of external nodes is to:
receive the values of the one or more local oscillator variables, and
adjust values of one or more other external oscillator variables that represent oscillator state information of the other external node based at least upon the values of the one or more local oscillator variables, wherein the values of the one or more other external oscillator variables are indicative of another external time value of the other external node.

7. The node of claim 3, wherein:
the local oscillator variables indicate a state of a local logical oscillator designed to define the local time value,
the first external oscillator variables indicate a state of a first external logical oscillator designed to define the first external time value, and
the second external oscillator variables indicate a state of a second external logical oscillator designed to define the second external time value.

8. The node of claim 1, wherein:
a first act of transmitting the first external oscillator variables by the first external peer node is independent of a first external time value, and
a second act of transmitting the second external oscillator variables by the second external peer node is independent of a second external time value.

9. A method for time-synchronizing nodes, the method comprising:
receiving, at a local node, first values of one or more first external oscillator variables from a first external peer node and second values of one or more second external oscillator variables from a second external peer node, wherein the first and second values of one or more first and second external oscillator variables respectively represent oscillator state information of a first logical oscillator of the first external peer node and a second logical oscillator of the second external peer node; and
determining whether the first and second values of the one or more first and second external oscillator variables are received before a time threshold, and on determination that the first and second values of the one or more first and second external oscillator variables are received before the time threshold:
determining a first trustworthiness of the first external peer node and a second trustworthiness of the second external peer node based upon the first external oscillator variables and the second external oscillator variables, and
adjusting values of one or more local oscillator variables that represent oscillator state information of a local logical oscillator based at least upon a weighting of the first values of the one or more first external oscillator variables and a weighting of the second values of the one or more second external oscillator variables, wherein the weighting is based upon the determined first and second trustworthiness, and wherein adjusting is based on a local oscillator parameter, wherein weighting factors are between zero and one.

10. The method of claim 9:
wherein the values of the one or more local oscillator variables are based at least upon values obtained from a local physical oscillator at the local node,
wherein the first values of the one or more first external oscillator variables are based at least upon a first external physical oscillator at the first external peer node,
wherein the second values of the one or more second external oscillator variables are based at least upon a second external physical oscillator at the second external peer node, and
wherein the local physical oscillator, the first external physical oscillator, and the second external physical oscillator drift over time from each other in at least one of phase or frequency.

11. The method of claim 9,
wherein the first values of the one or more first external oscillator variables are indicative of a first external time value of the first external peer node,
wherein the second values of the one or more second external oscillator variables are indicative of a second external time value of the second external peer node, and wherein the values of the one or more local oscillator variables are indicative of a local time value of the local node.

12. The method of claim 11, wherein:
a first time of reception of the first external oscillator variables is independent of a first phase of the first time, and
a second time of reception of the second external oscillator variables is independent of a second phase of the second time.

13. The method of claim 11, wherein the adjusting the values of the one or more local oscillator variables causes the local time value to shift closer to at least one of the first external time value or the second external time value.

14. The method of claim 11, comprising:
transmitting, from the local node, values of the one or more local oscillator variables,
wherein another external node of a set of external nodes is to:
receive the values of the one or more local oscillator variables; and
adjust values of one or more other external time variables of the other external node based at least upon the values of the one or more local oscillator variables, wherein the values of one or more other external oscillator variables are indicative of another external time value of the other external node.

15. At least one non-transitory, machine-accessible storage medium having instructions stored thereon, wherein the instructions are configured, when executed on a machine, to cause the machine to:
receive, at a local node, first values of one or more first external oscillator variables from a first external peer node and second values of one or more second external oscillator variables from a second external peer node, wherein the first and second values of one or more first and second external oscillator variables respectively represent oscillator state information of a first logical oscillator of the first external peer node and a second logical oscillator of the second external peer node; and
determine whether the first and second values of the one or more first and second external oscillator variables are received before a time threshold, and on determination that the first and second values of the one or more first and second external oscillator variables are received before the time threshold;
determine a first trustworthiness of the first external peer node and a second trustworthiness of the second external peer node based upon the first external oscillator variables and the second external oscillator variables, and
adjust values of one or more local oscillator variables that represent oscillator state information of a local logical oscillator based at least upon a weighting of the first values of the one or more first external oscillator variables and a weighting of the second values of the one or more second external oscillator variables, wherein the weighting is based upon the determined first and second trustworthiness, and wherein adjusting is based on a local oscillator parameter, wherein weighting factors are between zero and one.

16. The at least one storage medium of claim 15:
wherein the values of the one or more local oscillator variables are based at least upon values obtained from a local physical oscillator at the local node,
wherein the first values of the one or more first external oscillator variables are based at least upon a first external physical oscillator at the first external peer node,
wherein the second values of the one or more second external oscillator variables are based at least upon a second external physical oscillator at the second external peer node, and
wherein the local physical oscillator, the first external physical oscillator, and the second external physical oscillator drift over time from each other in at least one of phase or frequency.

17. The at least one storage medium of claim 15,
wherein the first values of the one or more first external oscillator variables are indicative of a first external time value of the first external peer node,
wherein the second values of the one or more second external oscillator variables are indicative of a second external time value of the second external peer node, and
wherein the values of the one or more local oscillator variables are indicative of a local time value of the local node.

18. The at least one storage medium of claim 17, wherein:
a first time of reception of the first external oscillator variables is independent of a first phase of the first time, and
a second time of reception of the second external oscillator variables is independent of a second phase of the second time.

19. The at least one storage medium of claim 17, wherein the adjusting the values of the one or more local oscillator variables causes the local time value to shift closer to at least one of the first external time value or the second external time value.

20. The at least one storage medium of claim 17, wherein the instructions are configured, when executed on the machine, to cause the machine to:
transmit, from the local node, values of the one or more local oscillator variables,
wherein another external node of a set of external nodes is configured to:
receive the values of the one or more local oscillator variables; and
adjust values of one or more other external oscillator variables of the other external node based at least upon the values of the one or more local oscillator variables, wherein the values of the one or more other external oscillator variables are indicative of another external time value of the other external node.

21. The at least one storage medium of claim 17, wherein:
the local oscillator variables indicate a state of a local logical oscillator designed to define the local time value,
the first external oscillator variables indicate a state of a first external logical oscillator designed to define the first external time value, and
the second external oscillator variables indicate a state of a second external logical oscillator designed to define the second external time value.

22. The at least one storage medium of claim 21, wherein:
a first act of transmitting the first external oscillator variables by the first external peer node is independent of the first external time value, and
a second act of transmitting the second external oscillator variables by the second external peer node is independent of the second external time value.

23. The node of claim 1, wherein the local time-update module is further to:
update the local oscillator variables $Z_{1,new}$, $Z_{2,new}$ from the first or the second external peer node using equations $$e_z = \hat{x}_1 - z_1$$

$$z_{1,new} = z_1 + [z_2 + rl_1|e_z|^{2/3} \operatorname{sign}(e_z)]\tau_z$$

$$z_{2,new} = z_2 + [\omega_0(1-z_1^2)z_2 - z_1 + r^2 l_2|e_z|^{1/3} \operatorname{sign}(e_z)]\tau_z.$$

24. The node of claim 1, wherein the local time-update module is further to:
update the local oscillator variables $Z_{1,new}$, $Z_{2,new}$ from the first or the second external peer node using equations $$e = \hat{x}_1 - x_1$$

$$x_{1,new} = z_1 + [x_2 + rk_1|e|^{1/2} \operatorname{sign}(e)]\tau_x$$

$$x_{2,new} = x_2 + [\omega_0(1-x_1^2)x_2 - x_1 + r^2 k_2 \operatorname{sign}(e)]\tau_x.$$

25. The node of claim 1, wherein the node is implemented as a system-on-chip device.

26. The method of claim 9, wherein the method is implemented on a system-on-chip device.

27. The storage medium of claim 15, wherein the machine is a system-on-chip device.

28. The method of claim 9, wherein oscillators are a selected one of: Van der Pol type oscillators implemented using equations $$x_{1,new} = x_1 + x_2 \tau$$

$$x_{2,new} = x_2 + [\omega(1-x_1^2)x_2 - x_1]\tau$$

or Andronov-Hopf type oscillators implemented using equations $$x_{1,new} = x_1 + [x_2 + x_1(1-x_1^2-x_2^2)]\omega\tau$$

$$x_{2,new} = x_2 + [-x_1 + x_2(1-x_1^2-x_2^2)]\omega\tau.$$

29. The method of claim 9, wherein values of one or more local oscillator variables $Z_{1,new}$, $Z_{2,new}$ that represent oscillator state information of the local node are based at least upon equations $$e_z = \hat{x}_1 - z_1$$

$$z_{1,new} = z_1 + [z_2 + rl_1|e_z|^{2/3} \operatorname{sign}(e_z)]\tau_z$$

$$z_{2,new} = z_2 + [\omega_0(1-z_1^2)z_2 - z_1 + r^2 l_2|e_z|^{1/3} \operatorname{sign}(e_z)]\tau_z$$

or equations $$e = \hat{x}_1 - x_1$$

$$x_{1,new} = x_1 + [x_2 + rk_1|e|^{1/2} \operatorname{sign}(e)]\tau_x$$

$$x_{2,new} = x_2 + [\omega_0(1-x_1^2)x_2 - x_1 + r^2 k_2 \operatorname{sign}(e)]\tau_x.$$

30. The storage medium of claim 15, wherein values of one or more local oscillator variables $Z_{1,new}$, $Z_{2,new}$ that represent oscillator state information of the local node are based at least upon the first values of the one or more first external oscillator variables and the second values of the one or more second external oscillator variables, using equations $$e_z = \hat{x}_1 - z_1$$

$$z_{1,new} = z_1 + [z_2 + rl_1|e_z|^{2/3} \operatorname{sign}(e_z)]\tau_z$$

$$z_{2,new} = z_2 + [\omega_0(1-z_1^2)z_2 - z_1 + r^2 l_2|e_z|^{1/3} \operatorname{sign}(e_z)]\tau_z$$

or equations $$e = \hat{x}_1 - x_1$$

$$x_{1,new} = x_1 + [x_2 + rk_1|e|^{1/2} \operatorname{sign}(e)]\tau_x$$

$$x_{2,new} = x_2 + [\omega_0(1-x_1^2)x_2 - x_1 + r^2 k_2 \operatorname{sign}(e)]\tau_x.$$

* * * * *